United States Patent [19]

Watanabe et al.

[11] Patent Number: 5,140,082
[45] Date of Patent: Aug. 18, 1992

[54] VINYLIDENE FLUORIDE TRIFLUOROMETHYLETHYLENE COPOLYMER

[75] Inventors: Junichi Watanabe, Ageo; Makoto Fujiwara, Kamisu, both of Japan

[73] Assignee: Shin-Etsu Chemical Co., Ltd., Tokyo, Japan

[21] Appl. No.: 794,697

[22] Filed: Nov. 20, 1991

Related U.S. Application Data

[63] Continuation of Ser. No. 494,508, Mar. 16, 1990, abandoned.

[30] Foreign Application Priority Data

Mar. 17, 1989 [JP] Japan .................................. 1-65344

[51] Int. Cl.$^5$ ............................................. C08F 14/18
[52] U.S. Cl. .................................................. 526/255
[58] Field of Search ......................................... 526/255

[56] References Cited

U.S. PATENT DOCUMENTS 2,842,529  7/1958  Bolstad .
4,268,653  5/1987  Uchidoi et al. .................... 526/255

FOREIGN PATENT DOCUMENTS 0320344   6/1989  European Pat. Off. ............ 526/255
954830    4/1964  United Kingdom .
1298170  11/1972  United Kingdom .

Primary Examiner—Joseph L. Schofer
Assistant Examiner—N. Sarofim
Attorney, Agent, or Firm—Oblon, Spivak, McClelland, Maier & Neustadt

[57] ABSTRACT

A vinylidenefluoride-trifluoromethylethylene copolymer comprising vinylidene fluoride and trifluoromethylethylene as monomer units, said trifluoromethylethylene being contained in an amount of 0.1 to 30 mol % based on all the monomeric units in the copolymer. This copolymer is excellent in weathering resistance, corrosion resistance, electrical characteristics, and processability as well as flexibility.

7 Claims, 2 Drawing Sheets

Elution time ⟶

Elution time

VINYLIDENE FLUORIDE TRIFLUOROMETHYLETHYLENE COPOLYMER

This application is a continuation of application Ser. No. 07/494,508, filed on Mar. 16, 1990, now abandoned.

BACKGROUND OF THE INVENTION

1. Field of the Invention

This invention relates to a vinylidene fluoridetrifluoromethylethylene copolymer.

2. Description of the Prior Art

Polyvinylidene fluoride has excellent weathering resistance, corrosion resistance, electrical characteristics, processability, etc., and therefore has been used in a diversity of uses. However, since polyvinylidene fluoride has great crystallinity, great residual stress may take place by processing, cracks due to the stress are liable to be formed with lapse of time. Since it has poor flexibility, impact resistance and cold resistance are also inferior as compared with other fluorine resins.

For example, polyvinylidene film is used as lining material for chemical apparatus by virtue of its good corrosion resistance. However, when the film is subjected to stress where it is bent, for instance, at edges, it is liable to crack. Once cracks are formed, chemicals may penetrate the film and cause corrosion of the chemical apparatus.

Accordingly, as those which overcome the drawbacks of the polyvinylidene fluoride, there have been known copolymers of vinylidene fluoride with various fluorinated olefins such as tetrafluoroethylene, hexafluoropropylene, vinyl fluoride and the like.

However, no copolymer of vinylidene fluoride and trifluoromethylethylene has been known in the prior art, and also it has not been known that this copolymer has excellent flexibility.

SUMMARY OF THE INVENTION

Accordingly, an object of the present invention is to provide a vinylidene fluoride-trifluoromethylethylene copolymer having excellent flexibility together with the characteristics inherently possessed by polyvinylidene fluoride in weathering resistance, corrosion resistance, electrical characteristics, processability, etc.

Specifically, the present invention provides a vinylidenefluoride-trifluoromethylethylene copolymer comprising vinylidene fluoride and trifluoromethylethylene as monomer units, said trifluoromethylethylene being contained in an amount of 0.1 to 30 mol % based on all the monomeric units in the copolymer.

The vinylidene fluoride-trifluoromethylethylene copolymer of the present invention has the excellent characteristics inherently possessed by polyvinylidene fluoride in weathering resistance, corrosion resistance, electrical characteristics, processability, etc., and also has excellent flexibility. Therefore, the copolymer of the present invention can be applied widely for coating materials, materials for painting, materials for weathering resistant films, materials of instruments for which corrosion resistance is required, etc. Specifically, the copolymer of the invention is suited to lining material for protecting chemical apparatus from corrosion because it can be cracked with difficulty, where it is bent.

BRIEF DESCRIPTION OF DRAWINGS

FIGS., 1 and 2 show respectively the $^{19}$F-NMR spectrum and GPC chart of the copolymer obtained in Example 1.

DESCRIPTION OF PREFERRED EMBODIMENTS OF THE INVENTION

Figure 1:
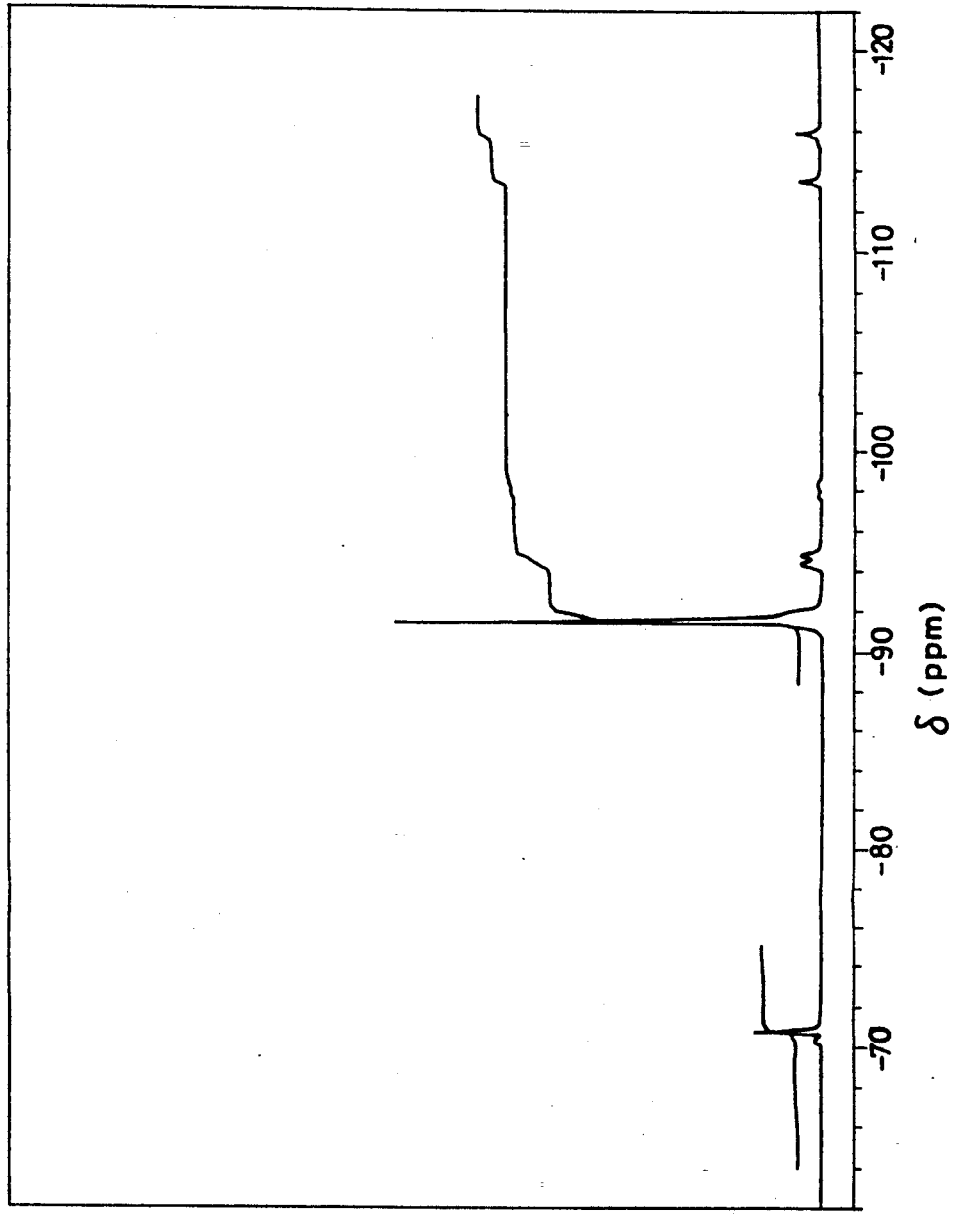

The copolymer of the present invention contains vinylidene fluoride and trifluoromethylethylene as monomeric units. That is, the copolymer contains the structural unit derived from vinylidene fluoride represented by the formula (I):

and the structural unit derived from trifluoromethyl ethylene represented by formula (II):

as essential structural units.

The copolymer of the present invention may also contain, in addition to vinylidene fluoride and trifluoromethylethylene, other monomer copolymerizable with vinylidene fluoride or trifluoromethylethylene as monomeric units. Examples of such other monomer include fluorine monomers such as tetrafluoroethylene, chlorotrifluoroethylene, hexafluoropropylene and the like; and ethylene, methyl methacrylate, etc. At least one compound of these can be used as a comonomer.

The content of trifluoromethyl ethylene in the copolymer of the present invention is from 0.1 to 30 mol preferably 0.5 to 20 mol %, based of all the monomeric units. If the content of trifluoromethylethylene is less than 0.1 mol %, flexibility of the copolymer is inferior, while if it exceeds 30 mol %, mechanical strength of the copolymer is inferior. On the other hand, the content of vinylidene fluoride may be normally from about 50 to 99.9 mol %, preferably from about 70 to 99.5 mol % based on all the monomeric units. If the content of vinylidene fluoride is too small, excellent characteristics inherently possessed by polyvinylidene fluoride such as weathering resistance, corrosion resistance, electrical characteristics, processability, etc. may be impaired.

The molecular weight of the copolymer of the present invention differs in range depending on the use and is not particularly limited, but generally the copolymer having too small a molecular weight is not desirable from the standpoint of mechanical strength of the copolymer. Normally, a weight average molecular weight of 5,000 or more, particularly about 10,000 or more is preferred.

The copolymer of the present invention can be prepared by polymerizing vinylidene fluoride and trifluoromethylethylene and, optionally, other components as required according to a method known in the art. Polymerization can be performed according to any polymerization system such as suspension polymerization, emulsion polymerization, solution polymerization, bulk polymerization, etc.

Where the copolymer is prepared by suspension polymerization, as the oil-soluble radical polymerization initiator to be used, any of those conventionally used may be available. For example, it includes organic peroxides such as diisopropyl peroxydicarbonate, di-n-propyl peroxydicarbonate, isobutyl peroxide, etc.; fluorine-containing organic peroxides such as heptafluorobutyl peroxide, trichloroperfluorohexanoyl peroxide, etc.; and azo compounds such as azobisisobutyronitrile. As the polymerization solvent, water is normally employed, but a hydrophobic halogenated hydrocarbon solvent such as trichlorotrifluoroethane, 1,2-dichlorotetrafluoroethane and the like may be also used in combination as desired. If necessary, a chain transfer agent such as acetone, isopropyl alcohol, and t-butyl alcohol; a pH buffering agent; a pH adjuster, etc. may be also used as desired. As the suspending stabilizer, water-soluble polymer compounds such as methyl cellulose, and polyvinyl alcohol known in the art may be available.

In the case where the copolymer of the present invention is prepared by emulsion polymerization, as a water-soluble radical polymerization initiator to be used, those used in the prior art may be employed, such as potassium persulfate, ammonium persulfate, etc. As an emulsifier, there can be used a fluorocarbon emulsifier conventionally used such as ammonium perfluorooctoate, etc. As for halogenated hydrocarbon solvents, chain transfer agents, pH buffering agents, pH adjusters, etc., the same are applicable as in the case of the abovementioned suspension polymerization.

Where the copolymer is prepared by solution polymerization, the halogenated hydrocarbon solvents as mentioned above, alcoholic solvents and ester solvents may be used as the polymerization solvent, and other components mentioned in the case of suspension polymerization are available similarly.

Polymerization temperature may be suitably selected depending on the polymerization system employed, and may be, for example, about 0 to 100 °C.

The pressure during polymerization may be suitably selected depending on the polymerization system, the ratio of monomers charged, the polymerization temperature, etc., and practically a pressure of about 1 to 100 atm. is normally employed.

The reaction time may be also suitably selected depending on the polymerization system, the ratio of monomers charged, the polymerization temperature, etc., and normally ranges from about 1 to 50 hours.

In the process of the present invention, the respective components may be charged into a polymerization vessel by charging initially all the amounts of vinylidene fluoride and trifluoromethylethylene and, if any, other various components which are optionally used, or alternatively by charging a part or all of either one or both of vinylidene fluoride and trifluoromethylethylene continuously or intermittently.

EXAMPLES

The process of the present invention is now described in detail by referring to Examples and Comparative examples.

EXAMPLE 1

Into a stainless steel reactor of one-liter inner volume were charged 500 ml of deionized water, 0.1 g of methyl cellulose, 0.2 g of disodium phosphate (decahydrate), 0.5 g of n-propyl peroxydicarbonate and 100 g of trichlorotrifluoroethane, and the reactor after replaced internally with nitrogen was evacuated to vacuum. Next, 10 g of trifluoromethylethylene was charged, and further 90 go of vinylidene fluoride was charged, followed by stirring at a rate of stirring blades of 800 rpm for 15 minutes. Subsequently, polymerization was initiated by heating to 45 °C. The inner pressure within the reactor initially indicated 30 atm. Thirty hours after initiation of polymerization, when the inner pressure lowered to 20 atm., the unreacted monomers were purged, the reaction mixture was then removed from the reactor, cooled, dehydrated and dried to give 65 g of a copolymer as white powder.

The copolymer obtained was dissolved in dimethylformamide, and the copolymer was purified by reprecipitation by adding an excess of a mixture of water/methanol (mixing ratio: 1/1).

Measurements of the trifluoromethylethylene (TFME) content and weight average molecular weight of the purified copolymer, and measurements of torsional rigidity as the index of flexibility, and depolarization intensity as the index of crystallinity were conducted according to the methods described below.

TFME content $^{19}$F-NMR spectrum of a 8 % solution of the polymer in DMF-d7 was measured by means of JNM-GSX-270 Model NMR apparatus manufactured by Nippon Denshi K. K.. The spectrum shown in FIG. 1 was obtained. In this spectrum: the peak attributable to the trifluoromethyl group ($-CF_3$) of trifluoromethylethylene was detected at the chemical shift ($\delta$) of $-70.8$ ppm. From the peak intensity ratio of this peak to the respective peaks detected at $-91.6$ ppm, $-94.8$ ppm, $-113.5$ ppm and $-115.9$ ppm attributable to the fluoromethylene group ($-CF_2-$), the TFME content in the copolymer obtained was calculated to be 6.8 mol %.

Weight average molecular weight

Figure 2:
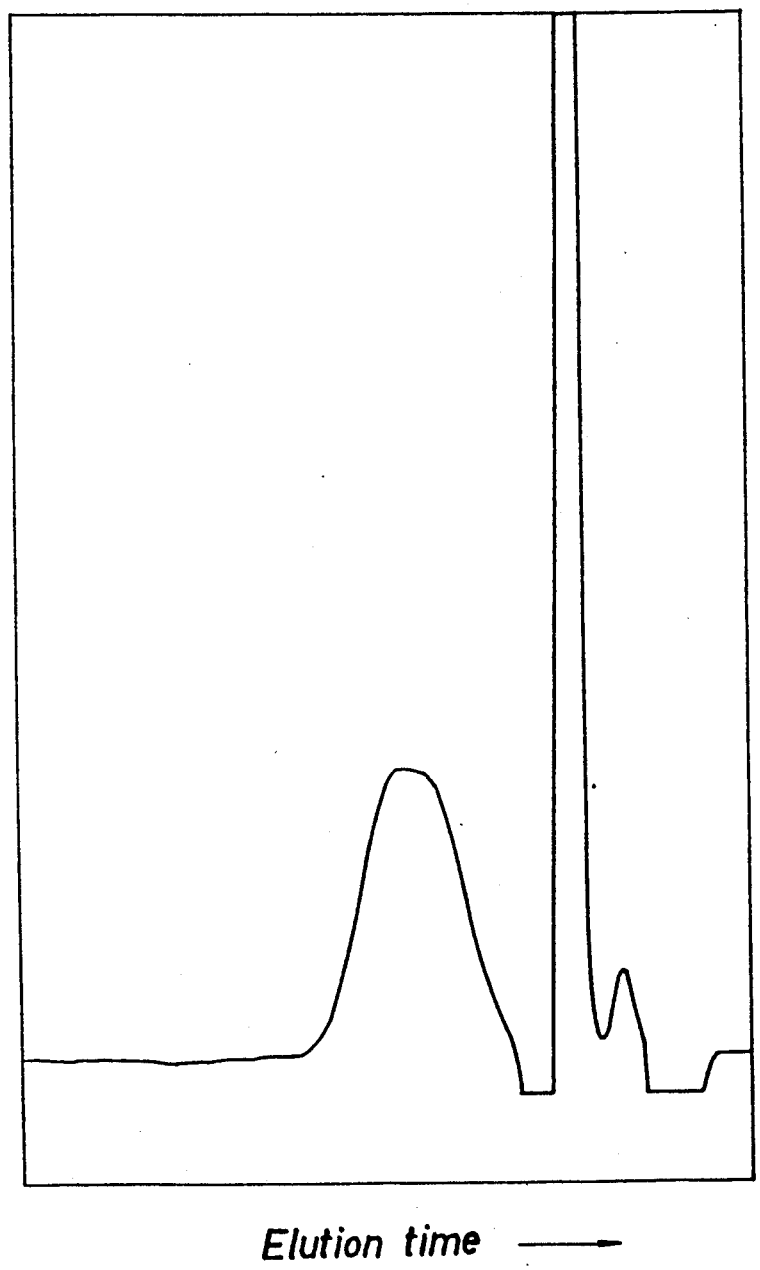

GPC chart of a solution of the copolymer dissolved to a concentration of 0.1 % in DMF was measured by means of HLC-8026 Model GPC apparatus manufactured by Toso Co. (by use of TSK gel GMH$_{XL}$ column) to determine the weight average molecular weight. FIG. 2 shows the GPC chart obtained.

Depolarization intensity

The copolymer was formed by hot press into a film with a thickness of 0.1 mm, and depolarization intensity at 140 °C. was measured by means of Kotaki Crystallization Rate Measuring Instrument MK-801 model (supplied by KOTAKI SEISAKUSHO).

Depolarization intensity decreases with increase in flexibility of the copolymer.

Torsional rigidity

The copolymer was formed by hot press into a plate with a thickness of 1 mm, and torsional rigidity at 30 °C. was measured according to JIS K-6745.

Example 2

Into a reactor made of a stainless steel of one liter inner volume were charged 500 ml of deionized water, 0.3 g of ammonium persulfate and 6 g of ammonium perfluorooctanoate, and the reactor after internally replaced with nitrogen was evacuated to vacuum. Next, 50 g of trifluoromethylethylene was charged, and the inner temperature was elevated to 80 °C. Next, vinylidene fluoride was charged into the reactor in an amount such that it gives and inner pressure of 50 kg/cm$^{-2}$, and the reaction was carried out. The inner pressure lowered with the progress of the reaction. When the inner pressure became 45 kg/cm$^{-2}$, vinylidene fluoride was further charged into the reactor, thereby the inner pressure being controlled to 50 kg/cm$^{-2}$. Further, the operation of controlling the inner pressure to 50 kg/cm$^{-2}$ was repeated until the total amount of vinylidene fluoride charged became 250 g. Then, when the inner pressure lowered to 40 kg/cm$^{-2}$, unreacted monomers were purged to give 740 g of a milky white uniform emulsion with a solid concentration of 32.5 %.

The emulsion obtained was subjected to salting out, and the precipitates were washed to obtain a polymer as white powder. After the polymer was purified in the same manner as in Example 1, TFME content, weight average molecular weight, depolarization intensity and torsional rigidity were measured. The results are shown in Table 1.

EXAMPLE 3

A polymer was obtained in the same manner as in Example 1 except for changing the amounts of trifluoromethylethylene and vinylidene fluoride charged to 1 g and 99 g, respectively. After purification of the polymer, TFME content, weight average molecular weight, depolarization intensity and torsional rigidity were measured. The results are shown in Table 1.

COMPARATIVE EXAMPLE 1

For the polyvinylidene fluoride manufactured by Solvay (trade name: Solef 1008), weight average molecular weight, depolarization intensity and torsional rigidity were measured in the same manner as in Example 1. The results are shown in Table 1.

TABLE 1

|  | Example 1 | Example 2 | Example 3 | Comparative example 1 |
| --- | --- | --- | --- | --- |
| TFME Content (mol %) | 6.8 | 14.3 | 0.5 | — |
| Weight average molecular weight ($\times 10^4$) | 16.5 | 8.5 | 35.4 | 32.2 |
| Depolarization intensity | 55 | 40 | 70 | 80 |
| Torsional rigidity ($\times 10^3$ kg/cm$^2$) | 2.9 | $\leq 1.0$ | 5.2 | 7.0 |

We claim:
1. A vinylidenefluoride-trifluoromethylethylene copolymer comprising vinylidene fluoride and trifluoromethylethylene as monomer units, said trifluoromethylethylene being contained in an amount of 0.1 to 30 mol % based on all the monomeric units in the copolymer.
2. The copolymer according to claim 1, wherein said trifluoromethylethylene is contained in an amount of from 0.5 to 20 mol % based on all the monomeric units in the copolymer.
3. The copolymer according to claim 1, wherein said vinylidenefluoride is contained in an amount of from 50 to 99.9 mol % based on all the monomeric units in the copolymer.
4. The copolymer according to claim 3, wherein said vinylidenefluoride is contained in an amount of from 70 to 99.5 mol % based on all the monomeric units in the copolymer.
5. The copolymer according to claim 1, which further comprises other monomer copolymerizable with the vinylidene fluoride and trifluoromethylethylene as monomer units.
6. The copolymer according to claim 5, wherein said other monomer is at least one compound selected from the group consisting of tetrafluoroethylene, chlorotrifluoroethylene, hexafluoropropylene, ethylene and methyl methacrylate.
7. The copolymer according to claim 1, which has a weight average molecular weight of not less than 5,000.

* * * * *